United States Patent

[11] 3,610,260

| [72] | Inventor | Thomas J. Kearney<br>Detroit, Mich. |
|---|---|---|
| [21] | Appl. No. | 811,458 |
| [22] | Filed | Mar. 28, 1969 |
| [45] | Patented | Oct. 5, 1971 |
| [73] | Assignee | Detrex Chemical Industries Inc.<br>Detroit, Mich. |

[54] DEGREASING APPARATUS AND METHOD
27 Claims, 7 Drawing Figs.

[52] U.S. Cl. ............................................ 134/12,
134/19, 134/83, 134/107, 134/108, 134/109,
134/151, 134/164
[51] Int. Cl. ............................................ B08b 3/10
[50] Field of Search ............................................ 134/12, 19,
61, 66, 108, 140, 151, 158, 160, 67, 68, 73, 74, 83,
63, 82; 202/170 D; 198/220; 417/80

[56] References Cited
UNITED STATES PATENTS

| 1,213,843 | 1/1917 | Coulbourn | 134/73 |
| 2,031,086 | 2/1936 | Woodruff et al. | 198/220 |
| 2,612,112 | 9/1952 | Williams | 417/80 |
| 2,618,376 | 11/1952 | May | 198/220 |
| 2,674,189 | 4/1954 | Lung | 417/80 |
| 2,690,836 | 10/1954 | Bergmann | 198/220 |
| 3,144,872 | 8/1964 | Kearney | 134/12 X |
| 3,150,005 | 9/1964 | Opila et al. | 198/220 X |

*Primary Examiner* — Albert G. Craig, Jr.
*Attorney* — Paul & Paul

ABSTRACT: An apparatus is provided for cleaning articles conveyed along a predetermined path, by bathing and rinsing the articles with a solvent, followed by a drying of the articles, with the solvent being recirculated for reuse, and with solvent particles that are evaporated during the drying operation being reclaimed for reuse.

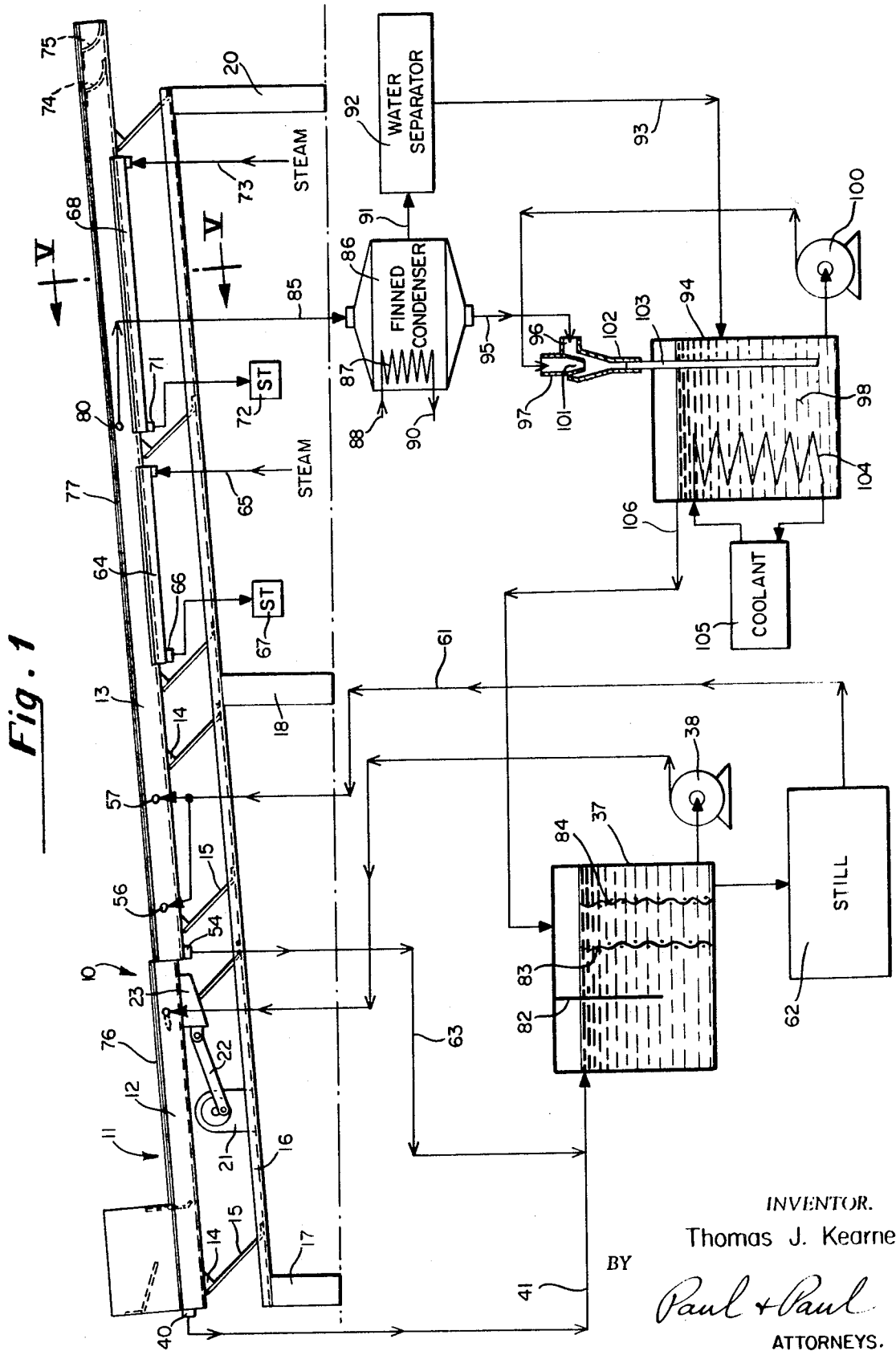

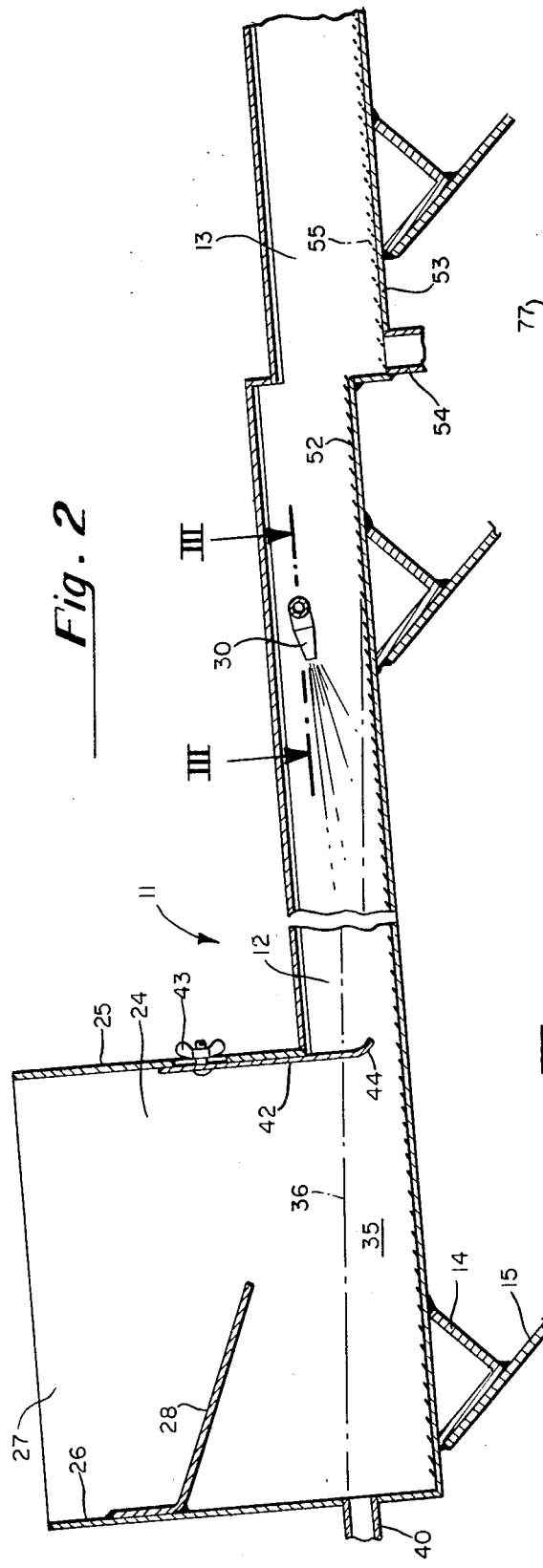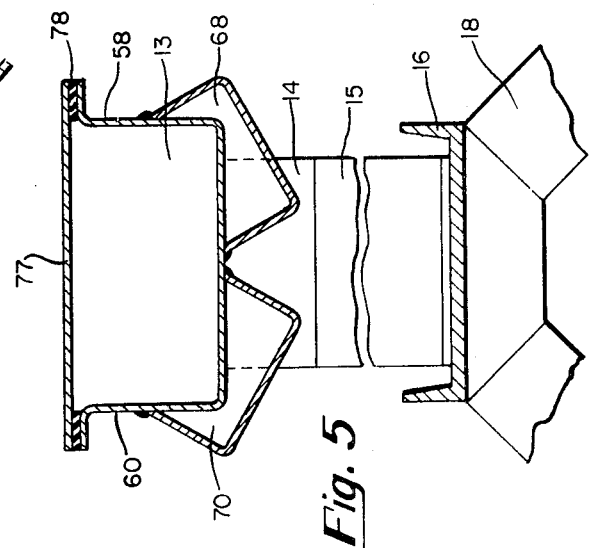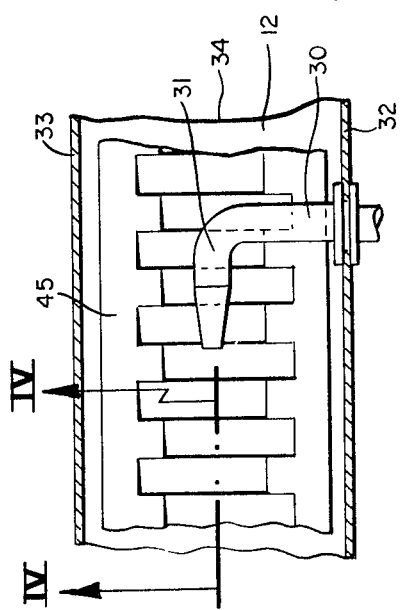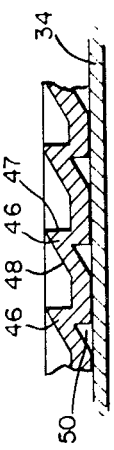
INVENTOR.
Thomas J. Kearney
BY
Paul + Paul
ATTORNEYS.

INVENTOR.
Thomas J. Kearney

BY

Paul & Paul

ATTORNEYS.

DEGREASING APPARATUS AND METHOD

BACKGROUND OF THE INVENTION

In many industries, particularly in industries wherein numerous metal parts are machined in repetitive fashion, such as in the manufacture of nuts and bolts and the like, during the machining of such small metal parts, various oils are used as coolants during the machining operations, leaving the machined parts with a residue of oil, generally of vegetable and mineral base. It is generally necessary to remove this oily residue or film prior to other processing operations on the machine components. The problem of oil removal is prevalent not only in the machining of small metal parts, but also in the formation of metal shavings, chips and the like, wherein oily films must also be removed.

In the past, various types of apparatus have been developed for cleaning such small metal parts and the like. However, in operations wherein a sizeable volume of metallic components must be cleaned, for example volumes on the order of 4,000 pounds per hour to 10,000 pounds per hour the sizes of conventional apparatus have been undesirably large, in order to effect the desired cleaning result. Such conventional apparatus have generally used degreasing tanks in which the articles would be immersed. When handling volumes of the type mentioned above, such tanks have, of necessity, been of such proportions that they inherently would have extremely large interfacial areas, or boundary layer areas wherein the solvent vapors come into contact with the ambient atmosphere. Accordingly, because such areas were large, there has been great opportunity for evaporation of solvent. Consequently, prior art devices have resulted in appreciable solvent losses. Still further, such prior art devices have required considerable quantities of steam for heating and water for effecting a condensing of any solvent from a solvent-laden atmosphere.

SUMMARY OF THE INVENTION

The present invention is directed toward providing an apparatus for treating or cleaning small metal parts, wherein the cleaning operation is effected under contained conditions to minimize the exposure of the solvent or solvent vapors to atmosphere.

Accordingly, it is a primary object of this invention to provide a novel apparatus for cleaning small parts by solvent, with a minimum exposure of the solvent to atmosphere.

It is a further object of this invention to accomplish the above object, wherein the cleaning is effected by movement of the articles to be cleaned through cleaning and drying zones by oscillation of the conveyor.

It is a further object of this invention to provide an apparatus for cleaning small metal parts with solvent by conveying them through cleaning and drying zones, wherein a novel means is provided for reclaiming any solvent vapors evaporated during the operation.

It is a further object of this invention to provide novel methods for accomplishing the objects recited above.

Other objects and advantages of the present invention will be readily apparent to one skilled in the art from a reading of the following brief description of the drawing figures, detailed description of the preferred embodiments, and the appended claims.

IN THE DRAWINGS

FIG. 1 is a schematic view, in side elevation, of a degreasing apparatus of this invention, for operation as a complete system.

FIG. 2 is an enlarged longitudinal sectional view, fragmentally illustrated, of a portion of the conveying apparatus of FIG. 1.

FIG. 3 is an enlarged sectional view, taken generally along the line III—III of FIG. 2, wherein the solvent inlet is illustrated, and wherein the kicker punch detail for assisting the movement of the articles being oscillated is also illustrated.

FIG. 4 is an enlarged transverse sectional view through the floor plate of the trough of FIG. 2, taken generally along the line IV—IV of FIG. 3.

FIG. 5 is an enlarged fragmentary transverse sectional view taken through the trough of the apparatus of this invention, generally along the line V—V of FIG. 1.

Figure 6:
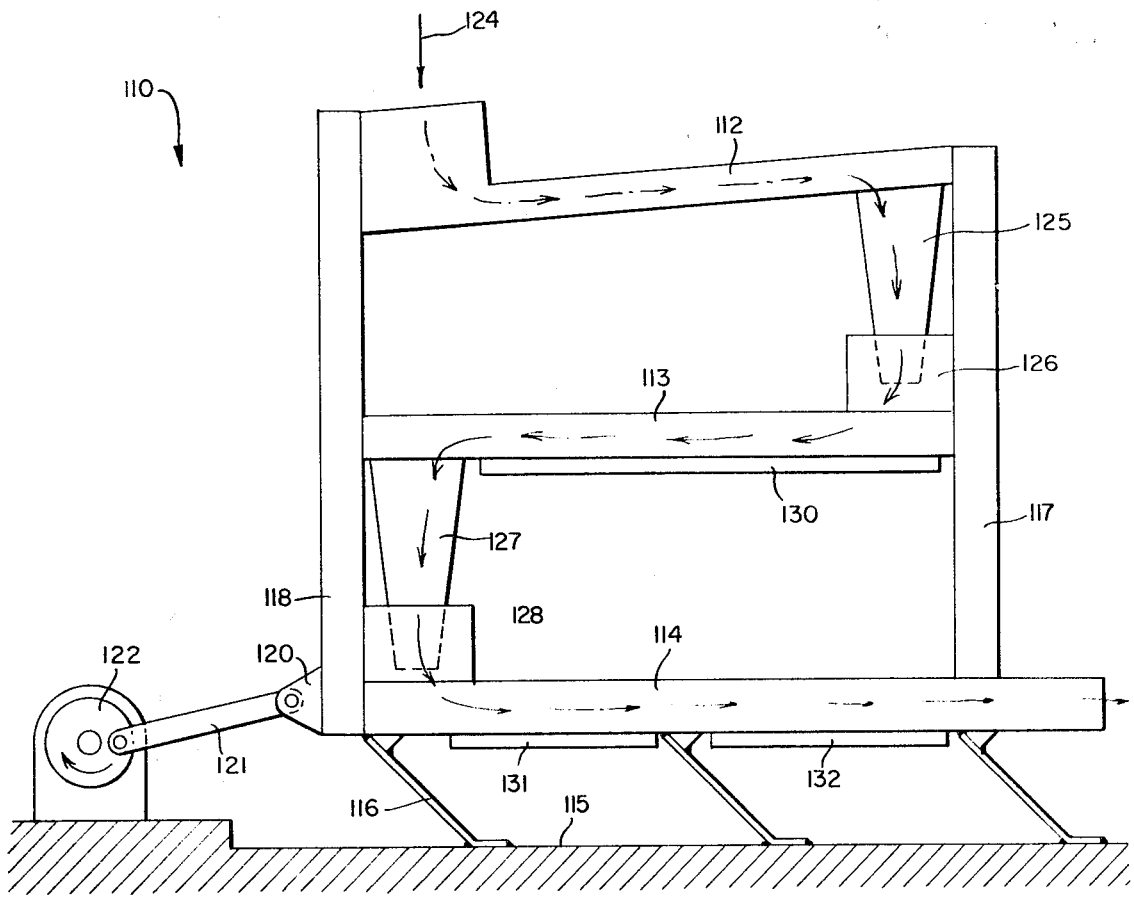
FIG. 6 is a side elevation view of an alternative form of the conveyor apparatus of this invention.

Referring now to the drawings in detail, reference is first made to FIG. 1 wherein there is illustrated a complete article cleaning system, generally designated by the numeral 10.

The apparatus 10 includes a conveying means, generally designated by the numeral 11, and comprises a pair of troughlike members 12 and 13, the members being of selected length, and the member 13 comprising either a singular trough or a plurality of sections coupled together, as desired. The troughs 12 and 13 have a plurality of angle irons 14 welded thereto, to which are welded or otherwise secured springlike resilient members 15, with the lower ends of the members 15 being secured, as by welding or the like to a horizontal support member 16. The horizontal support member 16 is, in turn, supported by a plurality of columnlike vertical supports 17, 18 and 20 such that the support 16 slopes upwardly from left to right, as viewed in FIG. 1.

Consequently, in any given positions of the troughs 12 and 13, such troughs slope generally upwardly to the right, as viewed in FIG. 1.

A motor-driven eccentric 21 is carried by the support 16, and connected by means of a linkage arm 22 to a boss 23 mounted, as by welding or the like to the undersurface of the trough 12. Upon actuation of the motor (not shown) which drives the eccentric 21, the linkage arm 22 thereby alternatively pushes and pulls on the boss 23, to consequently push and pull the troughs 12 and 13 rightward and leftward, in an oscillatory manner, due to the flexible nature of the springlike supports 15, permitting rightward and leftward movement of the troughs 12 and 13, as viewed in FIG. 1.

With particular reference to FIG. 2, it will be seen that a hopper 24 is provided at the leftmost end of the conveyor apparatus 11, the hopper being adapted to receive small metal components and the like, such as nuts and bolts, which are desired to be cleaned.

The hopper 24 may be constructed in the conventional manner, such as to have front and rear walls 25 and 26 respectively, and sidewalls 27. A baffle 28 is provided within the hopper 24, carried by the backwall 26, in order to limit the inflow of articles to be cleaned into the bottom of the conveyor 12, to a desired rate.

A forceful spray of solvent is provided into the trough 12 through a nozzle 30 extending into the trough 12, and being rearwardly bent as illustrated in FIGS. 2 and 3, at 31. The nozzle 30 is carried by a sidewall 32 of the trough 12.

A spray of solvent, such as perchlorethylene or trichlorethylene is provided through the nozzle 30, to flow rearwardly, or leftwardly, as viewed in FIG. 2, such that the bottom 34 of the trough 12 will become filled with solvent 35 to a desired level 36.

The level 36 of the solvent 35 in the trough 12 is maintained at a desired level by providing solvent to the nozzle 30 from a tank 37 by means of a pump 38, and by withdrawing excess solvent 35 from the trough 12 by means of an overflow pipe 40 at the leftmost side of the hopper 24, as viewed in FIG. 2. Solvents passing through the overflow pipe 40 (positioned at a selected location above the bottom 34 of the trough 12), pass through a solvent return line 41, into the tank 37.

An adjustable liquid seal baffle 42 is provided, carried by the front wall 25 of the hopper 24, and adjustable by means of loosening and positioning the baffle 42 as desired, by actuation of a wingnut 43. The lower end 44 of the baffle 42 extends into the solvent 35, below the solvent level 36, in order to provide a liquid seal, by using the solvent as such a seal, at the leftmost end of the trough 12, between the trough 12 and the hopper 24, for the purpose later to be described in detail, of preventing excessive loss of solvent in vapor form.

Articles thus dumped into the hopper 24 must pass beneath the lower end 44 of the adjustable baffle 42 to be conveyed throughout the rest of the article-conveying apparatus 11.

As has been set forth above, an eccentric drive 21 provides a back-and-forth oscillatory movement for the troughs 12 and 13. In order that this movement may be effective to continuously convey articles placed in the hopper 24 in a rightward direction as viewed in FIG. 1, the bottom surface of the trough 12 may be especially configured, as illustrated in FIG. 3. Such a configuration may consist of a separate plate 45 resting on the bottom 34 of the trough 12, the plate 45 having punched therein, in staggered relation, as viewed in FIG. 3, a plurality of kicker punch detail 46. Such detail 46 each provide an essentially vertical forward surface 47, and a backwardly sloped or raked surface 48, such that, during rightward movement of the trough 12, for example, the surface 47 may engage articles and move them also to the right, but that during leftward movement of the trough 12, and with constant leftward movement of the plate 45, any articles will slide over the surface 48, rather than being leftwardly propelled thereby, as viewed in FIG. 4.

The kicker punch detail 46 may be stamped therein, by means of punches engaging within a plurality of recesses 50 from beneath, which form the desired upper configurations as viewed in FIGS. 3 and 4, if desired.

In the alternative, it may be desired not to rely upon the configuration of the plate 45 as a means for urging articles within the troughs 12 and 13 to the right, as viewed in FIGS. 1 or 2, but that such conveying movement can be provided to articles by controlling the oscillatory motion of the troughs 12 and 13, merely be selecting a desired cam or the like for the eccentric drive 21. By this means, the oscillatory motion would be such that a greater thrust would be provided on articles during a rightward movement of the troughs 12 and 13, as viewed in FIGS. 1 and 2, than during the leftward movement, such that the leftwward movement of the troughs 12 and 13 would be more rapid, or otherwise controlled to effect a sliding of articles therealong during such leftward movement of the troughs 12 and 13. In any event, the rightward movement of the troughs 12 and 13 would be effective to cause a translation of articles carried on the upper surfaces of the bottom of the troughs 12 and 13, or on any desired plates disposed thereon.

As articles (not shown) are thus conveyed rightward through the trough 12, in the manner above-described, they pass out of the fluid bath 35, in which they are immersed, upwardly onto a rightmost end section 52 of the trough surface 34, beneath the solvent spray from the nozzle 30, where they may begin to drain. The articles are then oscillated into the conveyor section 13, which is illustrated with its lower end disposed slightly lower than the rightmost end of the trough 12, as viewed in FIG. 2, in order to facilitate the drainage of solvent from the trough section 13. The trough section 13 is provided with a lower surface 53, in which the drain 54 is provided. A plurality of louvered plate sections 55, or kicker punch detail 55 (illustrated in phantom) may optionally be provided on the bottom 53 of the trough 13, for facilitating the drain of solvent from articles. The articles conveyed along the bottom of the trough 13 may be moved from left to right by means of osicillatory movement provided solely from the eccentric drive 21, or may be moved therealong by means of the combination of oscillation and particular configuration of the drain members 55, as for example that illustrated in FIG. 3, if desired.

A plurality of rinsing nozzles 56 and 57 are provided in the sidewall 58 of the trough 13, which are provided with pure solvent through a solvent supply line 61, from a still 62.

The solvent draining from the articles will thus pass through the drain line 54, into the tank 37, through the solvent return line 63.

It will be noted that the drain louvered section in the trough 13 may be eliminated, if desired. In the latter instance, the movement of articles through the trough 13 would depend entirely upon the oscillation of the conveyor means 11, and would require a longer drying cycle, but would eliminate the problem of fine metallic particles passing entirely through the trough 13, in that such particles could be withdrawn through the drain 54.

Steam jackets 64 and 65 are provided, covering substantial side and bottom portions of a given length of the trough 13, as viewed in FIG. 1, for heating the articles carried therepast within the trough 13, in that steam is provided through a steam inlet 66, through the heater sections 64 and 65, and outwardly thereof at 66 for later steam regeneration by some suitable means such as that at 67.

A similar pair of steam jackets 68 and 70 are also provided, with a steam outlet 71, taking steam conveyed through the jackets 68 and 70 from the inlet line 73, and supplying such steam after heating articles conveyed therepast to a steam regeneration unit 72.

It will be recognized that any other suitable type of heating may be provided, other than the steam heating which is taught herein, such as electric heating and the like. However, steam heating provides one readily obtainable solution to the problem of vaporizing residual solvent film or particles from articles conveyed through the trough section 13, in order to render such articles completely free of solvent, the solvent being evaporated into the environment or atmosphere or zone of the trough 13.

The atmosphere of the trough 13 is contained, in conjunction with the atmosphere of the trough 12, by means of the adjustable solvent seal baffle 42 at the leftmost end of the apparatus 11, and by means of a pair of flaps 74 and 75, of rubber, leather or the like, at the rightmost end thereof, as viewed in FIG. 1, which permits articles to pass out of the trough 13 with a minimum loss of solvent-ladened air, from within the trough sections 12 and 13.

This substantially complete containment of the environment within the troughs 12 and 13 is facilitated also by cover portions 76 and 77, respectively associated with the trough sections 12 and 13, overlying such trough sections and separated therefrom by suitable gaskets such at that 78, to render such covers 76 and 77 to be substantially airtight relative to their respectively associated troughs 12 and 13.

Solvent which is evaporated into the air or environment within the troughs, particularly near the right end of the trough 13, as viewed in FIG. 1, is withdrawn by means of the withdrawal port 80 in the trough sidewall 58, in order that evaporated solid vapors may be reclaimed therefrom.

The used solvent delivered to the tank 37 through the lines 41 and 63 is maintained at a desired level therein, such level varying depending upon the needs of the solvent spray through a nozzle 30, in order to maintain the solvent level 36 to a desired height within the trough 12, and also dependent upon the needs of the rinse nozzles 56 and 57 which are supplied through the line 61 from the still 62. The solvent entering the tank 37 must therefore pass around a baffle 82, through screens or like mesh 83 and 84, which separate metal fines, large solids and the like therefrom, to be delivered from the rightmost side of the screen 84, into either the pump 38, or into the still 62. Additionally, a magnet or the like (not shown) may be provided within the tank 37 to withdraw metal fines from the solvent therein.

The still 62 may be of any conventional type, such as will remove soils, dirt, and other residue from the solvent passed therethrough. Such a still 62 may be of the percolator type, or of any other type, as desired.

Solvent laden air vapor exhausted through the port 80 is delivered through a line 85, into a finned condenser 86. The condenser 86 is provided with a refrigerating coil 87, of any desired type, such as of the type having either a cool water, or condensed solvent inlet and outlet 88 and 90 respectively, as desired. In addition, solvent condensed within the condenser may pass through a line 91, into a water separator 92, from which water is extracted, the solvent then passing through a line 93 into a tank 94.

Should a condenser such as that 86 not be utilized, or should such a condenser such as that 86 not be effective to condense all of the evaporated solvent from the exhausted air, the solvent laden air delivered through the line 85 may be drawn into the condenser 86, and therethrough, into the line 95 (or directly from line 85 to line 95 if the condenser 86 is not utilized), into a partial vacuum zone 96 of a jet device 97.

The jet device 97 is operated by delivering cool solvents 98 from the tank 94, and by means of a pump 100, placing the solvent 98 under pressure and exhausting such solvents through a nozzle 101 thereby permitting a solvent expansion between the throat of the nozzle 101 and the solvent-receiving portion 102 of the nozzle 97, such that the solvent would be delivered through the line 103 back into the tank 94. This sudden expansion of the solvent as it passes through the throat of the nozzle portion 101 creates a reduced pressure zone which functions as the partial vacuum for drawing solvent-laden air through the line 95, and into the lower portion 102 of the nozzle 97. By passing the air thus drawn through the solvent bath 98, the remaining solvent would be reclaimed therefrom. A refrigerating coil 104 or other cooling coil is provided, for maintaining the solvent 98 within the tank 94 at a sufficiently low temperature to assure that the same will remain in a liquid state, and also for facilitating the reclaimation of solvent from the air previously contained within the troughs 12 and 13. Such refrigeration may be provided by means of a suitable coolant generating device 105, or by any other suitable solvent cooling means. Solvent which is reclaimed within the tank 94 is retained therein until a sufficient overload level is reached, as which point, the solvents will flow through a delivery line 106, into the tank 37.

With particular reference to FIG. 6, a modified form of the conveyor apparatus is illustrated, generally designated by the numeral 110, which differs from the apparatus 11 of FIG. 1, in that it comprises a plurality of trough sections 112, 113 and 114 vertically arranged in stacked relation above one another. The apparatus 110 is carried on a suitable base 115, to which flexible supports 116 are secured, the supports 116 being generally similar to those 15 of FIG. 1.

A pair of vertical supports 117 and 118 are provided, which are connected with the troughs 112, 113 and 114, in order to form a rigid member. Vertical support 118 carries a boss 120, to which a link 121 is connected, which in turn is connected to an eccentric drive 122, generally similar to that of 21 of FIG. 1. Suitable cam-operated motions or the like for the eccentric 122 may be provided, as may be suitable louvered plate, kicker punch, or other floor plate combinations, if desired, at the bottom of the troughs 112, 113 and 114. In any event, the configurations of the bottom of the troughs 112, 113 and 114 must be such as to permit a flow of articles through such troughs as indicated by the serially disclosed arrows 123 in FIG. 6.

Articles fed to the conveyor device 110 of FIG. 6 will be delivered into a hopper 124, constructed similarly, also with a solvent seal-type baffle (not shown), as is the hopper 24 of FIG. 2, such that the articles would be immersed in a bath within the trough section 112 and would pass upwardly beneath a spray (not shown) generally similar to that 30 of FIG. 3, to be delivered through a chute 125, into a second hopper 126, and then leftward, as indicated through the arrows through the trough section 113, downwardly through another chute 127 into another hopper 128, and rightward through the trough section 114 through outlet flaps (not shown). Steam heater jackets 130, 131 and 132 are provided, generally similar to those of FIG. 1 also. Furthermore, solvent delivery, return, and spray devices, all similar to those discussed in the preferred embodiment above are also provided. Still further, conventional trough covers, such as those 76 and 77 would also be provided for the trough sections 112, 113 and 114. Thus, in essence, the apparatus 110 differs from that 11 only in that it may be broken-up into three vertically spaced trough sections, for space-saving purposes, if desired.

Figure 7:
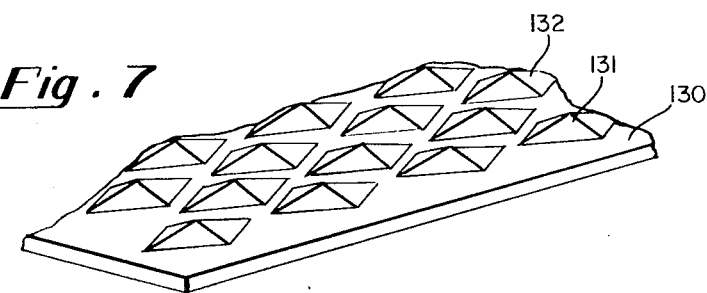
FIG. 7 is a fragmentary perspective view of an alternative floor plate construction for the troughs of this invention.

In FIG. 7 there is illustrated an alternative floor plate for any of the troughs or trough sections discussed above, for use either with the apparatus of FIG. 1, or FIG. 6. In this embodiment generally, diamond-shaped upward projections are provided, for facilitating drainage of solvent from articles passed thereover, if desired, with the diamonds generally having steeper slopes in the directions to which articles are to be pushed thereover, and having more gentle slopes or rakes, in a backward direction, also to facilitate the urging of articles passing thereover in a given direction. Accordingly, as in FIG. 7, a plate 130 may be provided with upwardly projecting diamonds 131 having desirably shaped sloped surfaces 132 thereon.

It will be apparent, that while throughout this application the term "trough" and "trough-shaped" have been used frequently, it is to be understood that such a term is intended to be used in its broadest sense and not to define only the generally rectangular configuration for the members 12 and 13, illustrated in FIG. 5. It will be noted that such a trough-shaped member could take on any number of cross section configurations, such as oval, or even round, as for example a pipe, such an embodiment not requiring a separate cover section.

It will be apparent from the foregoing that the apparatus disclosed herein are capable of providing the minimum exposure of solvent, or solvent vapors to atmosphere, thereby facilitating highly efficient reclaimation of solvents. It will further be noted that other solvents, such as methylene chloride, methylchloroform, and trifluorotrichloroethane may be used, as desired. It will also be apparent that many of the solvent and steam line inlets and outlets, such as those 40, 61, 66, 65 73 and the like should be preferably be of flexible line, such as being constructed of suitable plastics of the like.

Another method of recovery of the vaporized solvent from the article-heating zone would be to convey the solvent-laden air through an activated carbon adsorption system from which the adsorped vapors could be periodically stripped with steam, for example. A still further way of recovering the evaporated volatile solvent would be to conduct the hot solvent-ladened air to a low temperature, as for example to a refrigerated condensing coil which would be so arranged to utilize the thermosython effect to cause the flow of hot solvent vapors downward over a cold condensing surface.

It will further be noted that the constant stroke eccentric drive provides a smooth continuous surgeproof flow of work, and that the work flow, or flow of articles may be continuous, as long as there are articles to be provided, due to the solvent and solvent vapor reclaimation techniques disclosed herein. Still further, it will be noted that, if desirable, the oscillation may be so selected to be at or as near as possible the natural frequency of the supporting springs 15 or 116, in order that minimum power would be required by the motor drive for the eccentric, thereby placing minimum stress on the conveyor components.

It will be apparent from the foregoing that various modifications may be made in the details of construction, as well as in the use and operation of the apparatus of this invention, without departing from the spirit and scope of the invention as defined in the appended claims.

What is claimed is:

1. An apparatus for degreasing articles comprising means for conveying articles to be cleaned along a predetermined path, means for defining a substantially contained atmosphere for articles carried along the path, means for cleaning articles carried along the path, and means downstream of said cleaning means for drying articles cleaned, wherein said conveying means includes an elongated troughlike member and means for oscillating said member in the direction of the path of travel of articles being conveyed, with said cleaning means and drying means being carried by said oscillatable troughlike member.

2. The apparatus of claim 1, wherein means are provided also carried by said troughlike member for rinsing articles cleaned within said troughlike member, said rinsing means being located between said cleaning means and said drying means.

3. The apparatus of claim 2, wherein said rinsing means includes means for spraying solvent on articles conveyed from the bath.

4. The apparatus of claim 1, wherein said means which defines a substantially contained atmosphere comprises a cover for said troughlike member, wherein said member and said cover are closed to atmosphere intermediate their ends, with article inlet and article outlet means being provided at ends of said member.

5. The apparatus of claim 4, wherein said article inlet means comprises solvent bath means sealing said article inlet to said covered troughlike member.

6. The apparatus of claim 4, wherein said article outlet means comprises a pair of serially disposed flap means at the downstream end of said troughlike member for isolating the atmosphere within said member.

7. The apparatus of claim 1, wherein said oscillating means includes a plurality of longitudinally flexible members, including eccentric means for providing longitudinal back-and-forth movement of said troughlike member.

8. The apparatus of claim 1, wherein said member is disposed for defining an upwardly sloping path of travel of articles conveyed between inlet and exit ends of said member.

9. The apparatus of claim 1, wherein said cleaning means comprises means for providing a solvent bath for immersion of the article with said latter means being connectable to a source of solvent.

10. The apparatus of claim 9, wherein said cleaning means includes means for spraying solvent into the bath.

11. The apparatus of claim 10, including collecting tank means for receiving solvent from the bath, including delivery means for supplying solvent to said tank means upon said solvent reaching a predetermined level within said troughlike member, filtering means being disposed in said tank means, and pump means for delivering filtered solvent from said tank means to said spraying means.

12. The apparatus of claim 11, wherein said conveying means includes an elongated troughlike member and means for oscillating said member in the direction of the path of travel of articles being conveyed, wherein a still is provided for purifying solvent from said tank, said still being connected to said rinsing means for providing pure solvent thereto.

13. The apparatus of claim 1, wherein said drying means includes means for providing heat to the environment of articles being conveyed through said troughlike member to evaporate solvent from the articles into the substantially contained atmosphere defining means, and means for delivering air containing solvent vapor from said latter means, wherein said delivering means is connected to exhaust-inducing means.

14. The apparatus of claim 13, wherein said means for providing heat comprises steam chambers.

15. The apparatus of claim 13, including condensing means for condensing solvent from air thus exhausted.

16. The apparatus of claim 13 including exhaust inducing means in the combination, which comprises means for utilizing a stream of solvent to create a partial vacuum for drawing air containing solvent vapor through said delivering means.

17. The apparatus of claim 16, wherein said exhaust inducing means includes a tank for containing solvent and means for cooling solvent contained therein, pump means for recirculating solvent from said tank to a jet means, and jet means for receiving solvent pumped therethrough and for creating the partial vacuum.

18. The apparatus of claim 1, wherein said conveying means comprises a plurality of substantially parallel troughlike members, each having one of said cleaning and drying means carried thereby.

19. The apparatus of claim 18, wherein said cleaning means include immersion means and spraying means, wherein one said troughlike member is provided for each of said immersion means, spraying means and drying means, with said troughlike members being vertically spaced from one another and with adjacent said members being connected by hopper means for facilitating the passage of articles from one said member to another.

20. The apparatus of claim 1, wherein said article cleaning means includes at least an article immersion section, having a sloped bottom surface adapted to be at least partially immersed in solvent, with said bottom surface having upwardly projecting means for assisting the movement of articles along said troughlike member, up the sloped bottom surface thereof.

21. The apparatus of claim 20, wherein said projecting means comprise ribs having substantially vertical forward surface portions facing toward the upper end of said sloped surface, and raked rearward surface portions for permitting the sliding of articles over said rubs in a forward direction during oscillation of said member.

22. The apparatus of claim 20, wherein said projecting means comprise diamond configured floor plate portions, with surfaces of said portions arranged to urge articles in a desired direction during oscillation.

23. The method of articles comprising immersing the articles in a solvent bath, rinsing the articles with solvent, and drying the articles by heating them to evaporate solvent from the articles into a confined chamber, all of the above steps being accomplished within an oscillating trough as the articles are conveyed by oscillation of the trough during the conveying of articles through successive respective immersion, rinsing, and drying zones.

24. The method of claim 23, including recirculating the immersion and rinsing solvent, and cleaning and redelivering the solvent.

25. The method of claim 23, including reclaiming solvent evaporated from the chamber by exhausting solvent laden air from the chamber and condensing solvent therefrom fore reuse, as a continuous operation.

26. The method of claim 25, wherein the exhausting is effected by providing a solvent flow and using the flow to create a partial vacuum for withdrawing solvent laden air from the chamber.

27. Apparatus for cleaning articles comprising means for washing the articles with a solvent, means for drying the articles by causing evaporation of solvent therefrom in a contained air zone, means for exhausting solvent laden air from the zone, and means for extracting evaporated solvent from the solvent laden air, wherein said exhausting means includes a solvent flow means for creating a partial vacuum operative to remove solvent laden air from the zone.